3,214,431
NOVEL GLUTARIMIDES
Koppaka V. Rao, Pine Brook, William S. Marsh, Ringwood, and Aline L. Garretson, River Edge, N.J., assignors to Chas. Pfizer & Co., Inc., New York, N.Y., a corporation of Delaware
Filed Aug. 4, 1958, Ser. No. 753,594
8 Claims. (Cl. 260—281)

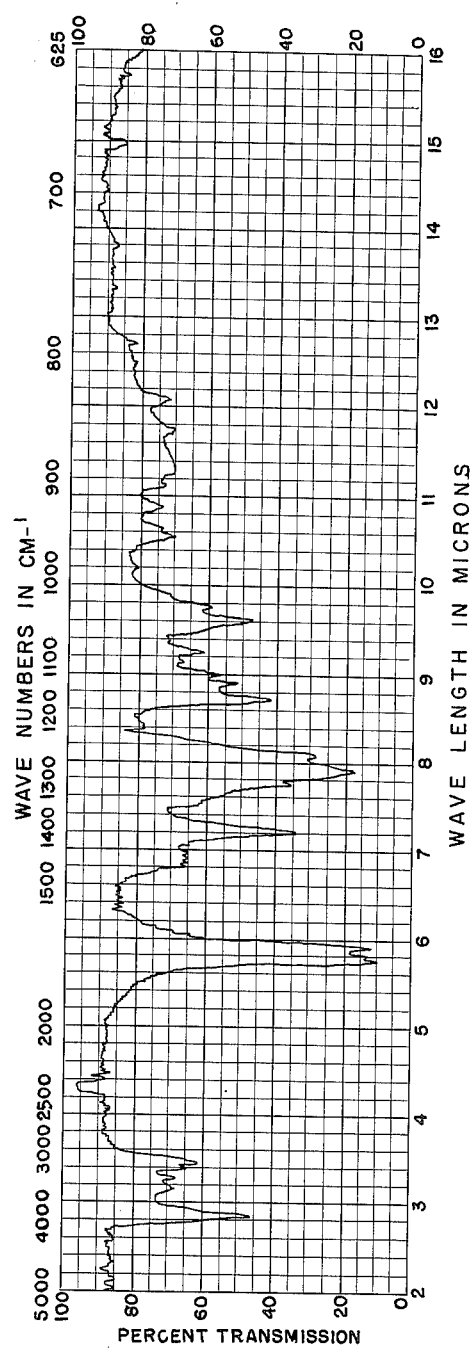

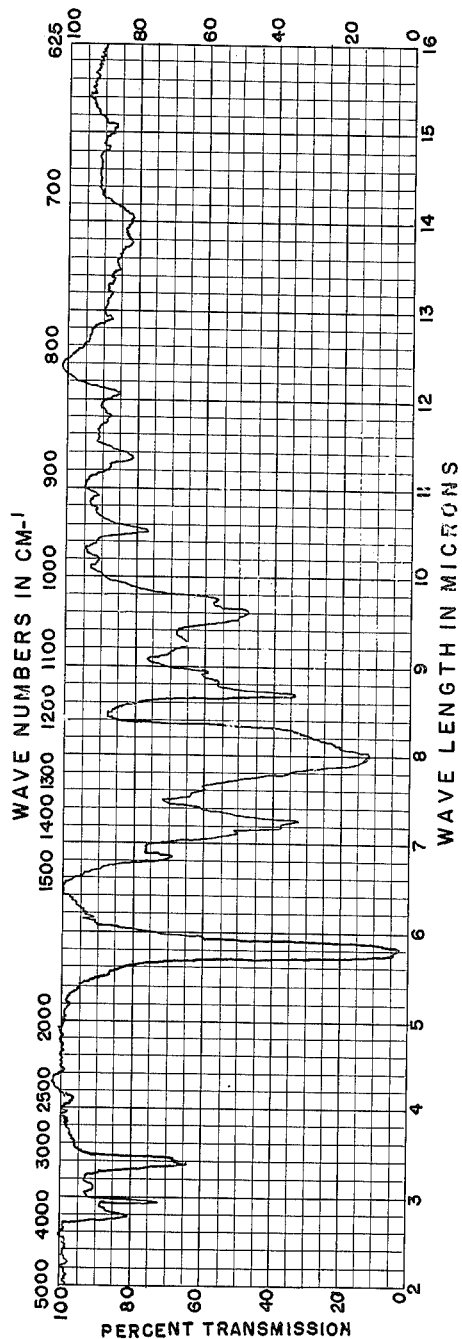

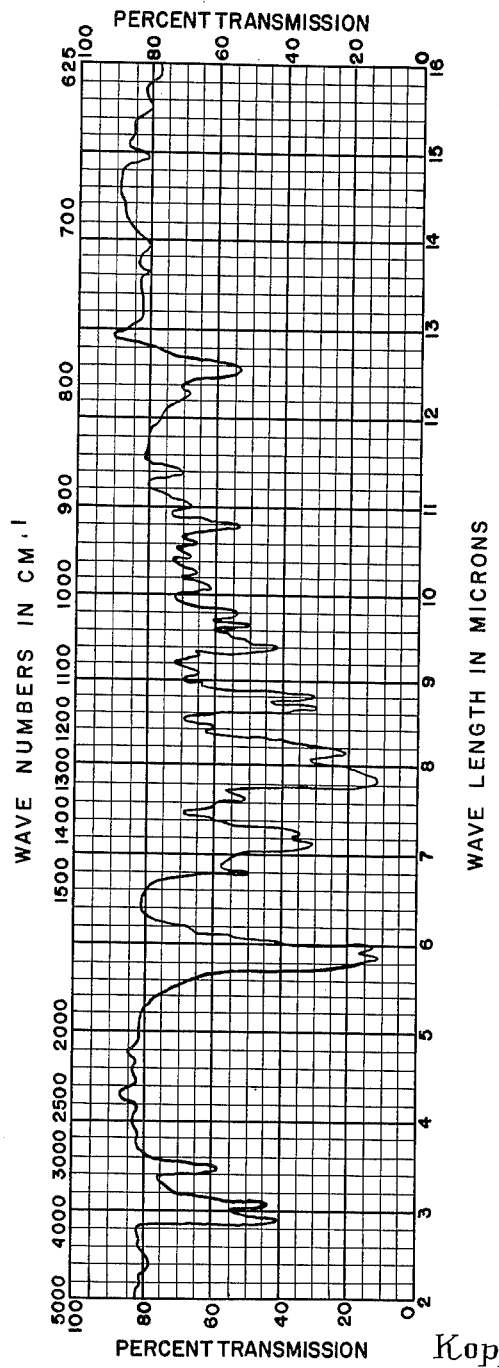

This invention relates to the cultivation under controlled conditions of the newly discovered species of microorganism, *Streptomyces albulus*, to methods for the recovery and concentration from crude solutions, including the fermentation broths, of the biologically active substances produced by this microorganism, and to a new and useful substance obtained thereby and certain of its derivatives. This application is in part a continuation of the two applications, Serial No. 651,092, filed April 5, 1957, and Serial No. 686,910, filed September 30, 1957, both now abandoned.

The present invention specifically relates to a new and useful fermentation product called E 73, in both its crude and purified forms, and to methods for the preparation, concentration, and isolation of this substance. Compound E 73 possesses useful antiprotozoal activity and antimicrobial activity for a variety of yeasts, yeast-like organisms, and fungi, which make possible important applications of it in therapeutics and in industrial fermentations. This invention also relates to the production of the known antibiotics, cycloheximide and fungicidin, by this new species of Streptomyces. In addition, the invention is concerned with the desacteyl derivative of compound E 73 which is prepared by the controlled hydrolysis of this substance, the acetyl group being removed leaving a hydroxyl group in its place, and with esters of the resulting alcohol. These substances have useful antimicrobial activity, particularly against fungi and yeasts.

The newly discovered microorganism which has been employed in the valuable process of the present invention was isolated from a soil sample, and found to have the characteristics of a member of the genus Streptomyces. For complete classification, it was planted in replicates of six on suitable media for the identification of microorganisms of this genus and incubated at the appropriate temperatures for two weeks. Readings of some of the media were made at intermediate periods, and results of the growth on all media were made at the end of the incubation period. The results are given below in Table I. The colors where R is written are those of Ridgway's Color Standards and Color Nomenclature.

The key to species of the genus Streptomyces in Waksman and Lechevalier's Actinomycetes and Their Antibiotics was used to identify the culture. No described species, however, matches this organism nor do the characteristics of any Streptomyces described subsequent to publication of this work agree with the culture. It was concluded, therefore, that a new and heretofore undescribed species of Streptomyces had been found for which the name *Streptomyces albulus* is proposed. Classification of this new species was made by Dr. J. B. Routien, who supplied the name and description given below. A culture of this microorganism has been deposited with the American Type Culture Collection at Washington, D.C. under the number ATCC 12757. This culture ATCC 12757 is hereby designated as the type culture of the new species.

TABLE I

*Culture Characteristics of Streptomyces Albulus*
*ATCC 12757*

| Medium | Amount of Growth | Aerial Mycelium Sporulation | Soluble Pigment | Remarks |
|---|---|---|---|---|
| Glucose-Asparagine Agar. | Moderate to good | Good; white at margins becoming brownish-gray (Light Mouse-Gray to Light Vinaceous Drab (R)) on spot plantings, lavender (near Pale Purple Drab (R)) on window plates. | None | Vegetative mycelium not visible; margins definite outline regular; surface rough; reverse creamy white to yellowish tan to yellowish tan to yellowish gray. Dilution Plates; essentially the same as spot plates except some colonies with only gray or only white mycelium. Spores borne in moderately tight to tight spirals; borne irregularly along hyphae; formed by fragmentation; subglobose, .65–1.30 x .65–1.30. |
| Skimmed Milk | Moderate | Sparse, white | Orange Tan (Salmon-Buff (R)). | Pellicle creamy white; milk coagulated; peptonized up to one-half of milk; change in pH from pH 6.5 to pH 7.0. |
| Glucose Agar | Good | Moderate, white | Light-Tan (Warm Buff (R)). | Vegetative mycelium colorless; reverse bright yellowish tan. |
| Nutrient Agar | Moderate | do | None | Vegetative mycelium colorless; reverse yellowish tan. |
| Synthetic Agar | do | Moderate to good; white to light gray. | do | Vegetative mycelium colorless where visible; reverse grayish white; growth poorly penetrating. |
| Calcium Malate Agar | Sparse to moderate | Moderate to good; white | do | Vegetative mycelium colorless; reverse creamy white. |
| Cellulose | No growth | | | |
| Potato Plugs | Good | Moderate; white | Very light grayish tan | Vegetative mycelium grayish tan (Olive-Buff (R)); surface deeply irregularly convoluted; odor earthy. |
| Dextrose-Nitrate Broth. | Moderate | Moderate to good, white | None | Slight reduction of nitrates to nitrites two tubes, others show no reduction. |
| Emerson Agar | Moderate to good | Moderate, scattered white | Yellowish tan | Vegetative mycelium colorless; reverse yellowish tan. |
| Starch Plates | Poor to moderate (colonies small). | Good, white to gray (Light Mouse Gray (R)). | None | Vegetative mycelium not visible; colonies raised; reverse creamy white; zone of hydrolysis 3.0 to 4.0 cm. in diameter. |
| Gelatin Plates | do | Sparse to moderate; white | do | Vegetative mycelium yellowish tan; zone of liquefaction 1.5 to 1.8 cm. in diameter. |

It is to be understood that for the production of compound E 73, as well as cycloheximide and fungicidin, according to the present invention, limitation to the aforesaid organism is not intended. It is especially desired and intended to include mutants produced from the described organism by various means such as irradiation with X-rays or ultraviolet light, treatment with nitrogen mustards, and the like.

The present invention embraces the process for growing Streptomyces albulus under controlled conditions to produce compound E 73 and also relates to the production of cycloheximide and fungicidin by the cultivation of this organism. E 73 was produced employing shake flasks each containing 225 ml. of the following medium.

|  | G./l. |
|---|---|
| Glucose | 10 |
| Soy bean meal | 15 |
| Dipotassium phosphate | 5 |
| Sodium chloride | 2 |
| Distiller's solubles | 2.5 |
| Calcium carbonate | 2 |
| Tap water to volume. | |

The acidity of the medium was adjusted to pH 7 and the batch sterilized by autoclaving for 20 minutes at 15 lb. steam pressure (121° C.). The inoculum was prepared using the same medium. The growth of a well sporulated slant of Streptomyces albulus was transferred to a flask prepared as above and placed on a rotary shaker at 28° C. for 36–40 hours. The resulting growth was used to inoculate similar flasks of broth of the same composition employing 5% by volume of inoculum. Inoculated flasks were then fermented under the above conditions for 60 hours. The beer was filtered over glass wool and the filtrate passed through a sintered glass filter of ultra fine porosity. Filtrates prepared in this fashion were found to possess about 50–100 S. cerevisiae dilution units of activity per milliliter.

For the recovery and prepartion of concentrates of E 73 according to a preferred embodiment of the present invention the fermentation beer is first filtered employing 2–5% of a diatomaceous filter aid. The mycelium is found to contain 80% of the fungicidin produced while the compounds of this invention remain in the broth. The remaining 20% of the fungicidin is retained in the broth following the solvent extraction step below. In most instances where it is desired to recover E 73, no attempt is made to recover the fungicidin. However, recovery of fungicidin can be achieved by known methods or as described hereinafter. The filter cake after filtration of the beer is washed with water using 10% the volume of the original beer, and then the combined filtrate and washes are extracted with one-half volume of an immiscible solvent such as chloroform, ethyl acetate, methyl isobutyl ketone, etc. at pH 7. The pH at this stage is not critical, the range pH 2–8 being operative. Compound E 73 is a neutral substance which appears to be quite stable. However, discomposition seems to occur above pH 8 in solution. The solvent layer from such an extraction is found to be highly active in both the yeast and tumor assays hereafter described. The bulk of the solvent can be removed, if desired, by distillation in vacuo at 30–40° C., the volume of the residue being approximately 2% of the original extract volume. This concentrate can then be poured into a larger volume of, say, ligroin which results in the precipitation of a crude sample of E 73. Little E 73 activity remains in the solvent layers.

The highly active semi-solid mass obtained in this fashion can then be purified by chromatography on alumina in the following fashion. A column of 3½ by 10 inch dimensions containing 20–40 g. of chromatographic alumina per gram of crude E 73 to be purified is employed. A column of the above size is suitable for approximately 100 g. of crude concentrate obtained as above. The E 73 containing solids are then dissolved in ethyl acetate to afford a solution of 1–2% concentration and passed through the column. Development of the column is conducted with ethyl acetate followed by 2% methanol is ethyl acetate. Progress of the chromatogram is followed by measuring the dry solid weights of 5 ml. aliquots of eluate and assaying the residues. The methanol is first added to the eluting solvent after about 5 l. of ethyl acetate has been used per kilo of alumina. At this stage about 60–70% of the original material on a weight basis has been eluted. A total of about 8 liters of solvent per kilo of alumina is required to develop the column. The aliquots are combined into fractions on an activity basis.

The first 10% of the original solid material to pass through the column is inactive in the yeast assay and contains almost no antitumor active material. It is a crystalline solid of colorless rectangular plates, M.P. 258–260°, and has been designated Fraction B. The name Fraction A had been assigned to the fungicidin recovered earlier. Fraction B is soluble in pyridine and dimethyl formamide but is only slightly soluble in water or the common organic solvents. The crystals exhibit a pale yellow fluorescence under ultraviolet light and, when dissolved in alkali, yield a yellow solution. Acidification of the yellow alkaline solution causes the original material to precipitate. Fraction B recrystallized from pyradine-ethyl acetate has the composition in percentages by weight: carbon, 70.03%; nitrogen, 10.40%; hydrogen, 6.20%; oxygen (by difference), 13.37%. It exhibits a maximum in the ultraviolet region of the spectrum at $$320 \text{ m}\mu. \ E_{1 \text{ cm.}}^{1\%} \ 102$$

Its specific rotation is $\alpha_D{}^{25} = +3.43°$ (c, 0.4 in dimethylformamide). It possesses a characteristic infrared absorption curve.

The second and main fraction obtained in the development of the alumina chromatogram represents about 50% of the original E 73 containing semi-solid solvent extract isolate on a weight basis. This material is highly active in the antitumor and yeast assays. It is a pale yellow, glass-like solid, fairly soluble in water and readily soluble in the common organic solvents. This material contains cycloheximide and E 73 as the principal active components. It can be further separated by partition chromatography employing an aqueous methanol-isopropyl ether solvent system on silica gel. The solvents may be prepared by shaking 1 volume of aqueous methanol (55% methanol on a volume basis) with 5 volumes of isopropyl ether. From about 10 to 25 grams of silica gel per gram of this fraction are employed in a column of appropriate dimensions. The silica gel is first treated with the upper solvent phase above, that is the isopropyl ether saturated with aqueous methanol, in the proportion of 10 ml./g. of silica gel, and about 0.25 ml. of the lower aqueous methanol solvent phase per gram of silica gel is added. The latter is absorbed by the silica gel. About 80% of this silica gel slurry is then charged to the column and the glass-like active solid to be separated is mixed with the remainder of the silica gel-solvent slurry. This is stirred well and transferred to the column. Development of the column is carried out with the isopropyl ether phase from above and the activity of successive aliquots of the eluate assayed by the Saccharomyces cerevisiae assay method hereafter described.

In one specific embodiment, 100 g. of this crude glass-like E 73 concentrate from the alumina chromatogram, 2000 g. of silica gel, 6–8 liters of the aqueous methanol saturated isopropyl ether phase, and 500 cc. of the aqueous methanol phase was employed. The column containing the E 73 concentrate was then developed with the isopropyl ether solvent phase and 500 ml. fractions collected. The first 10 fractions contained only inactive oily material. The next 20 fractions, that is, fractions 10–30 contained a mixture of two solids having relatively low activity. One of these solid materials proved to be identical with that designated Fraction B obtained from the alumina column. The other component was different from Fraction B but also of relatively low activity. It was designated Fraction C. Fractions B and C were separated on the basis of their differential solubility in ethyl acetate, Fraction C being the more soluble. The properties of these two materials are compared in Table II.

TABLE II

*Comparison of the properties of B–73 and C–73*

| Property | B-73 | C-73 |
|---|---|---|
| 1. Melting point | 275° | 199–200°. |
| 2. Appearance | Colorless thin rectangular plates. | Pale yellow needless. |
| 3. Behavior under ultraviolet light. | Little or no fluorescence | Bright yellow fluorescence. |
| 4. Formula | $C_{15}H_{18}O_2N_2$ | $C_{15}H_{17}O_4N$. |
| 5. Action of aq. sodium hydroxide. | Soluble to give a yellow solution. | Soluble to give a yellow solution. |
| 6. Action of conc sulfuric acid. | Bright yellow solution | Bright yellow solution. |
| 7. Alcoholic ferric chloride | No color | Green. |
| 8. $(\alpha)_D^{25}$ (C, 0.4 in dimethyl formamide) | 3.43 | 5.06. |

The next twenty eluate aliquots, from the silica gel column, that is aliquots 30–50, contained a high proportion of solids which proved to be principally cycloheximide. Two crystalline forms of cycloheximide were obtained. These were designated the hard and soft modifications. The names D73-2 and D73-1 respectively were assigned. The hard modification, D73-2, correspond in physical properties to that described in the literature. It melted at 118–119° C. while the so-called soft crystalline form of cycloheximide, D73-1, melted at 100–105° C. A physical mixture of these two modifications melted at 85–95° C. Each crystalline form acted as a seed for crystallization of its own crystalline type from saturated solutions of cycloheximide. Form D73-1 was the first to be eluted from the column. The properties of these substances are compared in Table III.

TABLE III

*Comparison of the properties of the two types of cycloheximide*

| Property | D73-1 | D73-2 |
|---|---|---|
| 1 Melting point | 100–105° C | 118–119°. |
| 2 Mixed melting point with cycloheximide. | 85–95° | 118–119°. |
| 3 Crystal structure | Soft, opaque clusters of rectangular plates. | Hard, transparent rectangular prisms. |
| 4 $(\alpha)_D^{25}$ | +12 | –3.3 |
| 5 Infrared spectrum as KBr pellet. | 3.10, 5.85, 6.82, 7.0, 7.20, 7.70, 7.82, 8.06, 8.70 $\mu$. | 2.82, 5.90, 6.75, 6.82, 6.92, 7.02, 7.20, 7.30, 7.40, 7.60, 7.80, 7.95, 8.0, 8.72, 9.0 $\mu$. |
| 6. Infrared spectrum in chloroform. | Identical with that of cycloheximide. | Identical with that of cycloheximide. |
| 7. Microbiological activity | 1,000 cycloheximide units/mg. | 1,000 cycloheximide units/mg. |

A highly purified sample of E–73 was obtained from the silica gel column after development with seventy 500 ml. portions of isopropyl ether saturated with aqueous methanol. Again E–73, although highly purified, was obtained as a glass-like material which was not crystalline, but could be pulverized into a pure white microcrystalline-like solid. A sample of the pure crystalline material was then obtained by treatment of a saturated ethanolic solution with 4 volumes of ether. A 75% recovery of crystalline E–73 was obtained.

Countercurrent distribution studies with pure crystalline E–73 by the Craig technique employing 14 transfers and the solvent system water-benzene-ethyl acetate 5:4:1 showed that the bulk of the material concentrated in the seventh tube. The distribution coefficient for this system was 0.95. The infrared absorption spectrum of E–73 is similar to that of cycloheximide but with significant differences. Principal maxima appear at the following wave lengths on a curve prepared from a 1% KBr dilution: 3509, 3165, 3058, 2941, 2907, 1727, 1715, 1686, 1385, 1290, 1266, 1261, 1236, 1147, 1127, 1115, 1081, 1038, 1025, 948, 921, 852, and 826 cm. –1. When measured on a 2½% chloroform solution significant maxima appeared at: 3559, 2950, 1727, 1709, 1391, 1149, 1131, 1116, 1041, 1025, 946, 878, and 826 cm. –1. The ultraviolet absorption spectrum measured on a methanol solution of E–73 had a maximum at 285 m$\mu$ (E=20), characteristic of a simple ketone group. The infrared spectra are shown in detail in FIGURE 1 and FIGURE 2 respectively.

E-73 is a neutral substance which can be further differential from cycloheximide by heating with aqueous sodium hydroxide as described by C. Kornfeld et al., Journal of the American Chemical Society, 71, 150 (1949). In contrast to the results reported for cycloheximide, dimethylcyclohexanone was not obtained from E-73 by this degradative technique. Ammonia was evolved. E-73 fails to yield characteristic reactions with ferric chloride, ninhydrin or bromine. It does, however, afford a crystalline derivative with 2,4-dinitro-phenylhydrazine, and also yields an oxime. Its melting point is 140–141° C., $(\alpha)_D^{25}$ –8.8° C. (c, 1.0 in methanol) and its composition corresponds substantially to the empirical formula $C_{17}H_{25}O_6N$. Its molecular weight determined ebullioscopically in acetone is 312 and 349 in duplicate runs. Quantitive determination of the carbonyl group with hydroxylamine hydrochloride indicates 0.82 C=O per mole. Titration of E-73 with alkali showed no titratable groups at pH 4.0–10.5.

To further characterized pure crystalline E-73, the acetate and p-nitrobenzoate derivatives were prepared by treatment of E-73 in pyridine with acetic anhydride and p-nitrobenzoyl chloride respectively. In each instance monoesters were obtained. The acetate, M.P. 177–178° C., crystallized from ether as colorless silky needles, and the formula $C_{19}H_{27}O_7N$. The p-nitrobenzoate had the formula $C_{24}H_{28}O_9N_2$, M.P. 167–168° C. and crystallized from ether-methylene chloride as colorless thin rectangular plates.

It has already been indicated that compound E-73 is decomposed by dilute sodium hydroxide. It is quite sensitive to alkali, being unstable above pH 8 and rapidly decomposing at pH 10.

The above recovery and purification method is summarized in the following flow sheet.

sorption on a variety of materials including silica gel, alumina, carbon, clays, Fluorosil, Magnasil, and other silicates, or recovered by evaporation or precipitation.

Compound E 73 is an acetoxy derivative of cycloheximide, the acetoxyl group being attached to the dimethyl- PRODUCTS OF STREPTOMYCES ALBULUS ATCC 12757, RECOVERY AND PURIFICATION OF FERMENTATION

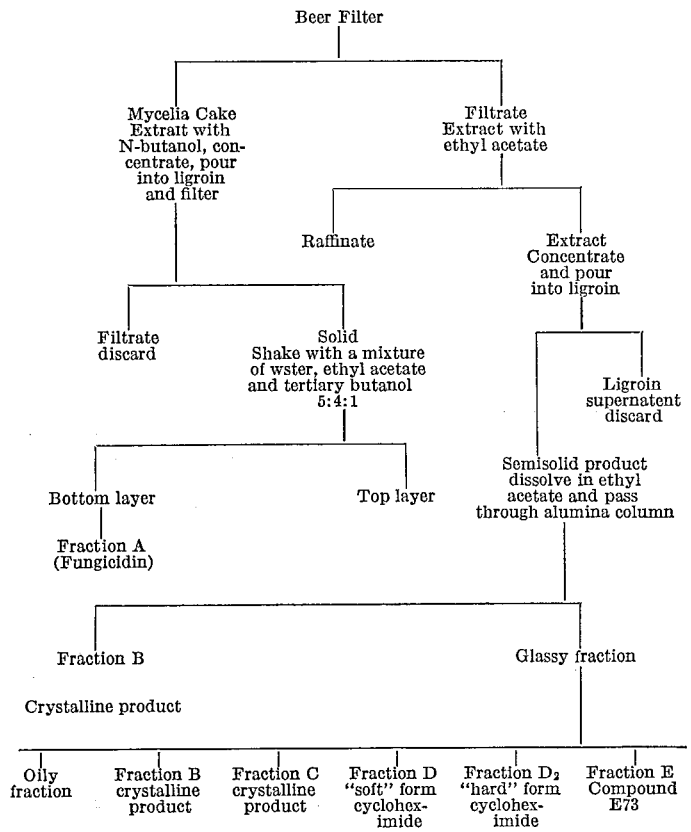

For the commercial production of compound E 73 and for the production of fungicidin and cycloheximide according to the process of this invention, a medium of composition similar to that described above is employed. The growth of the microorganism and antibiotic production usually reach their maximum at about 2-5 days. However, variation in the equipment used, the rate of aeration, and the rate of stirring and so forth may affect the speed with which maximum activity is reached. In general, the fermentation is continued until substantial antimicrobial activity is imparted to the medium based on the S. cerevisiae assay. A period of from about 24 hours to five days at about 26-30° C. is ordinarily required. Aeration of the medium in submerged growth is maintained at the rate of about ½ to 2 volumes of air per volume of broth per minute. Agitation is maintained by suitable types of agitators generally familiar to those in the fermentation industry. Aseptic conditions, of course, must be maintained throughout the transfer of the inoculum and throughout the growth of the microorganism. The mycelium is removed from the fermentation broth by various standard equipment such as filters and so froth. Thereafter, the antibiotic activity may be recovered from the fermentation broth by several different procedures including solvent extraction, broth demineralization with ion exchange resins and absorption on various materials such as carbon and alumina. As already pointed out, a pH of from 2 to 8 is preferred when solvent extraction is employed to remove the antitumor active substance from the filtered broth. The active material may be removed from solvent extracts by abcyclohexanone ring. The following structure is proposed.

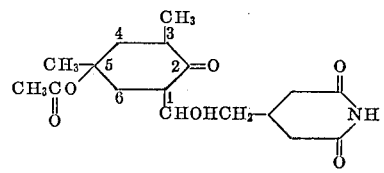

FORMULA I

The systematic name for this substance, according to Chemical Abstracts nomenclature, is 3-[2-(5-acetoxy-3,5-dimethyl-2-oxocyclohexyl) - 2-hydroxyethyl]glutarimide. The exact location of the acetoxyl group on the cyclohexanone ring is not definite but it is thought that it is attached at the 5-position. Various biologically active derivatives can be prepared as a result of a variety of chemical transformations on this compound E 73. For instance, controlled hydrolysis removes the acetoxy group to give the free 5-alcohol. The structure of Formula II is proposed for this substance:

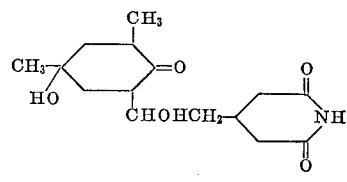

FORMULA II

This new substance has been designated desacetyl E 73. Its systematic name is 3[2-(5-hydroxy-3,5-dimethyl-2-oxocyclohexyl)-2-hydroxyethyl]glutarimide.

Desacetyl E 73 is a colorless crystalline substance having M.P. 165–166° C. It is soluble in water and in most of the common organic solvents including both polar solvents such as the lower alkanols, ketones and esters and non-polar solvents such as the liquid aromatic hydrocarbons, and polyhalogenated aliphatic hydrocarbons. It is insoluble in the aliphatic hydrocarbon solvents. Desacetyl E 73 exhibits characteristic absorption in the infrared region of the spectrum. Its absorption curve obtained employing a potassium bromide pellet of the substance is illustrated in FIGURE 3. It exhibits a low intensity maximum at 280–285 m$_\mu$ ($E$=25) and intense and absorption in the ultraviolet region of the spectrum.

Treatment of desacetyl E 73 with the common acylating agents such as the carboxylic acid halides, anhydrides and mixed anhydrides yields diesters. In the specific instances where acetic anhydride is employed, a diacetate identical with compound E 73 acetate hereinbefore described is obtained. Other useful esters are obtained, however, from desacetyl E 73 as an intermediate which are not obtainable from E 73 itself. Thus, acylation of E 73 itself, for instance with palmithyl chloride, yields a compound having the acetate group originally present in E 73 and the palmitate group introduced by the esterification. On the other hand, treatment of desacetyl E 73 with palmityl chloride yields a dipalmitate which is not obtainable directly from E 73. These symmetrical diesters have uses similar to those of the esters of E 73 and they have increased solubility in the organic solvents. The term, "symmetrical" is used since both ester acyl groups are the same although the molecule is, of course, not actually symmetrical in the usual sense of the word.

Prolonged heating of either of E 73 or desacetyl E 73 in acid solution (6 NHCl for 5–10 minutes at 60–80° C.) results in the loss of two molecules of water with the accompanying aromatization of the cyclohexanone ring for which the structure of Formula III is proposed.

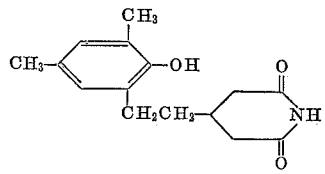

FORMULA III

This substance is a colorless, crystalline solid. It is insoluble in water, absorbs at the characteristic region in the ultraviolet (280 m$_\mu$, $E$=2000), has principal infrared bands at 2.90, 3.18, 5.80 and 5.92, and has a M.P. of 147–148° C. The aromatic compound of Formula III yields a monoacetate, on treatment with acetic anhydride in the presence of pyridine, which melts at 130–132° C.

Alkaline hydrolysis of III yields ammonia and a crystalline acid IV. The latter product is also obtained when E 73 or desacetyl E 73 or Compound III is hydroyzed with refluxing 6 N hydrochloric acid for 3–4 hours. This acidic product IV has the molecular formula $C_{15}H_{20}O_5$. Its ultraviolet spectrum also has a maximum at 280 m$_\mu$ ($E$=2000) and the infrared spectrum has characteristic bands at 2.88, 3.3, 3.4, 5.8 and 5.98 $\mu$. Titration gave an equivalent weight of 139 thus showing that it is a dibasic acid. It can be acetylated to a mono acetate or methylated to the corresponding methyl ether.

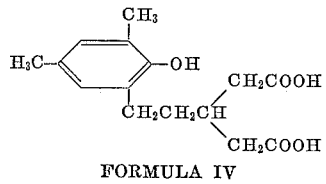

FORMULA IV

Ether-extraction of the alkaline hydrolysis mixture of E 73 gave a colorless high boiling ketone $C_8H_{14}O_2$ (V) (B.P. 135° C. at 0.3 mm. Hg). This product was almost odorless and highly soluble in water and common organic solvents. Its ultraviolet spectrum showed a single maximum at 280 m$_\mu$ ($E$=19) and the infrared spectrum had strong bands at 2.95 and 5.85$\mu$. It could be converted to a monoacetate but attempts to prepare a p-nitrobenzoate were not successful. It did not react with periodate. When heated with strong acids it produced a volatile, fragrant product which had the characteristics of an $\alpha,\beta$-unsaturated cyclic ketone (ultraviolet maxima 235 m$_\mu$, $E$=7700 and infrared bands at 5.82$\mu$ and 5.95$\mu$ with only weak poorly resolved absorption centering at 2.9$\mu$.

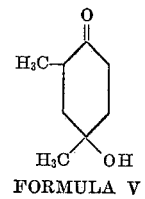

FORMULA V

Desacetyl E 73 is prepared by treatment of E 73 with dilute aqueous mineral acid at temperatures up to about 40° C. By dilute aqueous mineral acid is meant mineral acid having a concentration of up to about 6 N. Operative acids include hydrochloric acid, hydrobromic acid, hydriodic acid, nitric acid, sulfuric acid, etc. On a weight basis 6 N solutions of these acids have concentrations of about 20–30%. Use of more concentrated acid results in the dehydration and aromatization of the desacetyl compound as already described, as does the use of higher temperatures. Thus, employing 6 N hydrochloric acid at room temperature for about thirty to sixty minutes, good yields of desacetyl E 73 are obtained. However, if the temperature is raised to 80° C. for a period as short as five minutes dehydration with the formation of the corresponding aromatic compound occurs. More dilute solutions of the mineral acids down to about 5%, and lower temperatures down to about 5° C. may be employed but, of course, in such instances correspondingly longer reaction periods of up to about 24–48 hours are required. The optimum concentration, time and temperature can easily be determined for any operative acidic reagent by a series of simple small scale experiments in which different values for these variables are tested. In general, with a given mineral acid an optimum yield of desacetyl E 73 is obtained employing specific combinations of concentration, time, and temperature selected as described above. For hydrochloric acid the optimum temperature is about 25° C., the concentration is 6 N, and time 30 to 40 minutes.

Basic hydrolysis of E 37 fails to give satisfactory results for the production of the desacetyl compound of the present invention due to the accompanying hydrolysis of the imide function and to more profound changes such as reverse aldolization resulting in cleavage of the molecule.

An important application of desacetyl E 73 is based on its unique ability to prevent the growth of yeasts and fungi without affecting bacteria in commercial fermentations such as the processes for the production of ascorbic acid, glutamic acid, $\alpha$-ketoglutaric acid, various steroids, lysine, and in the production of vinegar. In general, bacterial fermentations such as these which are conducted at or near a neutral pH in aqueous media are subject to yeast contamination providing unwanted by-products to the detriment of the desired fermentation. The presence of desacetyl E 73 in the fermentation medium does not affect the fermentation per se, and prevents such a condition from arising. Desacetyl E 73 has useful activity against the human pathogens *Cryptococcus neoformans* and *Trichomonas viaginalis*, and against the yeasts *Saccharomyces cerevisiae*, *Torulopsis albida*, and *Kloeckera brevis*. Its activity against the pathogens indicates its use in the treatment of cryptococcosis, a serious disease which often affects the lungs and particularly the central nervous system as well as the skin, and also its use in the treatment of trichomonas vaginitis.

Compound E 73 and its esters have substantial activity against various yeasts, yeast-like organisms, and protozoa, but very little antibacterial activity. The antimicrobial activity is in general similar to that of cycloheximide although somewhat less active. The E 73 class of compounds can be employed for similar uses. In particular, E 73 has shown a useful degree of activity against the human pathogens *Cryptococcus neoformans*, and *Trichomonas vaginalis*, and agaist the yeasts *Saccharomyces cerevisiae*, *Torulopsis albida*, and *Kloeckera brevis*. Its activity against the above pathogens indicates its use in the treatment of cryptococcosis, a serious disease which often affects the lungs, and particularly the central nervous system as well as the skin, and also its use in the treatment of trichomonas vaginitis. A further application for this substance, based on its unique antimicrobial spectrum, is in commercial bacterial fermentations such as proccesses for the production of ascorbic acid, gluconic acid, α-ketoglutaric acid, various steroids, lysine, and in the production of vinegar. In general, bacterial fermentations which are conducted at or near a neutral pH in aqueous media are subject to yeast contamination, providing unwanted by-products to the detriment of the desired ferementation. The presence of compound E 73 in the fermentation medium prevents such a condition from arising.

Cycloheximide, of course, is also active against *S. cerevisiae* and with mixtures containing cyclohexamide and E 73, the ultimate distinction is made on the basis of the antitumor test. Of course, other methods are also available for distinguishing cycloheximide from E 73, including both chemical and physical means, but with crude isolates the yeast and tumor assays are most convenient.

Compound E 73 and certain of its representative esters have been compared for their activity against two significant protozoa with the following results.

In vitro antiprotozoal results:

| Sample | MIC against T. vaginalis, μ/cc. | MIC against E. histolytica, μ/cc. |
| --- | --- | --- |
| E-73 | 3.12 | 1-3 |
| E-73 Acetate | 250 | 1-3 |
| E-73 Propionate | 50 | 1-3 |
| B-73 Butyrate | 25 | 1-3 |

Compound E 73 is a relatively toxic substance, as previously indicated. A lethal dose for mice by the intraperitoneal route was found to be of the order of 700 mcg./kg. of body weight. The substance was less toxic by the subcutaneous route. In seven day chronic toxicity tests on healthy mice to which pure crystalline compound E 73 was administered (two 0.5 ml. injections daily of aqueous solutions containing appropriate drug concentrations), the $LD_{50}$ was found to be 600 mcg./kg.

The following examples are provided to further illustrate in detail methods for the practice of the present invention. They are, however, not to be considered as limiting the invention in any way.

*Example I*

Approximately 10 liters of a fermentation broth having the following composition was prepared and the batch adjusted to pH 7.

|  | g./l. |
| --- | --- |
| Glucose | 10 |
| Soybean meal | 15 |
| Dipotassium phosphate | 5 |
| Sodium chloride | 2 |
| Distiller's solubles | 2.5 |
| Calcium carbonate | 2 |

The broth was then distributed to a number of 1 l. Erlenmeyer flasks each containing approximately 225 ml. of the medium, and the flasks with contents sterilized by autoclaving for 20 minutes at 15 lb. steam pressure (121° C.). The inoculum was prepared by transferring the growth of a well sporulated slant of *Streptomyces albulus* ATCC 12757 to a flask of the above medium and incubating the same at 28° C. for 36 to 40 hours on a rotary shaker. Two such inoculum flasks were prepared. The remaining flasks containing the sterile broth were then inoculated with about 5% their volume of the inoculum so prepared and incubated by shake culture at 28° C. for 65 hours. The finished beer was then filtered over glass wool and the clear filtrate passed through a sintered glass filter of ultra-fine porosity providing a sterile filtrate. This filtrate was found to possess from about 200 to 300 *Saccharomyces cerevisiae* dilution units of activity per milliliter by the standard plate assay.

*Example II*

For the recovery of fungicidin (fraction A) a broth prepared as described in Example I is extracted once with ⅓ volume of n-butanol. The solvent layer is then used for extraction of the mycelial cake. The final extract is concentrated at reduced pressure to one twentieth the original volume. A pale yellow microcrystalline solid separates from this concentrate when it is allowed to stand for several hours in the refrigerator. The solid is collected and washed with dry butanol. One gram of this crude material is shaken with a mixture of 20 ml. each of the two layers of the solvent mixture, water-ethyl acetate-t-butanol (5:4:1). The layers are separated and the clear aqueous layer set aside to crystallize in the refrigerator. The pale yellow solid which separates, is collected, and washed with water. The crystalline product consists of small rectangular plates which melt with decomposition at about 150° C., and have the following composition in close agreement with that previously reported for fungicidin: C, 59.95; H, 8.30; N, 1.33.

*Example III*

Approximately 10 liters of filtered fermentation broth prepared as described in Example I was extracted at pH 7 with 5 l. of ethyl acetate. The solvent extract was evaporated under reduced pressure at a temperature of 30–40° C. to approximately ⅟₆₀ of its original volume. The residue was then poured into 5 volumes of high-boiling (B.P. 60–90° C.) petroleum ether. The semi-solid mass which precipitated was collected. Its weight was approximately 50% the weight of the original ethyl acetate concentrate which had been treated with petroleum ether. An additional quantity of solid material was recovered from the supernatant petroleum ether by shaking with 80% aqueous methanol (v./v.) The solvent was removed from the aqueous methanol layer and the concentrate added to the solids originally precipitated. This amorphous concentrate was found to contain a number of components comprising in addition to E73, cycloheximide and unidentified, biologically inactive materials.

In separate runs chloroform, butanol, and methyl isobutyl ketone were employed for solvent extraction of the broth in the same quantities used with ethyl acetate. In other runs, solvent extraction of the broth at pH's in the range pH 2 to 8 gave equivalent results.

*Example IV*

A more purified E 73 concentrate was prepared from the product of Example III. A 10 in. chromatographic column 3½ in. in diameter was prepared containing 2 to 2.5 kg. of acid washed alumina (Merck). The crude product of Example II, 100 g., was then dissolved in from 2 to 3 l. of ethyl acetate and this solution was percolated through the column. The resulting chromatogram was developed by passing fresh solvent (ethyl acetate) through the column followed by a solvent mixture made up of ethyl acetate containing approximately 2% of methanol on a weight basis. Approximately 10–12 l. of ethyl acetate was used for development prior to introduction of the solvent mixture. A total of about 16 l. of solvent was used to develop the chromatogram. The eluate was collected in 500 cc. portions; the solvent evaporated from each portion; and the progress of the development followed by measuring the dry weight and anti-yeast assay of each fraction. The residues were then combined into fractions on the basis of their anti-yeast assays. Development was continued until all anti-yeast active material had been removed.

The first fraction constituted approximately 10% of the total solids charged to the column. It was designated fraction B and was inactive at 1 mg./kg. on the anti-yeast assay. It is active at higher dosages. This material is crystalline comprising colorless matted needles of M.P. 258–260° C. Its solubility in the common organic solvents, both polar and non-polar, and in water is very slight. It is, however, soluble in pyridine and in dimethylformamide. The crystals exhibit a bright yellow fluorescence when exposed to ultra-violet light. It dissolves in aqueous alkali yielding a yellow solution, treatment of which with acid results in precipitation of the original unchanged substance. Microanalysis indicates that crystalline fraction B contains 70.03% carbon, 6.20% hydrogen and 10.40% nitrogen. It exhibits a maximum at 320 m$\mu$ in the ultra-violet region of the spectrum, has an extinction coefficient $$D_{1\,cm}^{1\%} = 101$$

and specific rotation $(\alpha)_D^{25} = +3.43°$ (C. 0.4 in dimethylformamide).

The remainder of the eluate residues were combined yielding a second fraction representing about 50% of the original solids charged to the column on a weight basis and the bulk of the anti-yeast and anti-tumor activity. It was a neutral glass-like solid, fairly soluble in water and very soluble in the common organic solvents. It proved to be a mixture comprising cycloheximide, E 73, and inactive material.

*Example V*

A pure crystalline sample of compound E 73 was prepared from the concentrate of Example IV by partition chromatography on silica gel treated with aqueous methanol-saturated isopropyl ether. One hundred grams of silica gel was suspended in 1 l. of isopropyl ether which had been previously shaken with 55% aqueous methanol (v./v.) in the ratio 1 volume of the aqueous methanol to 5 volumes of isopropyl ether. Approximately 25 ml. of the lower aqueous methanol phase was mixed with the above silica gel slurry until the silica gel was uniformly impregnated. Approximately ⅘ of this slurry was then transferred to a glass column of suitable size. The glass-like solid product of Example IV, 6 g., was then added to the remainder of the impregnated silica gel slurry which resulted in its being adsorbed on the silica gel. This was then added to the column and development of the column commenced employing the 55% aqueous methanol-saturated isopropyl ether solvent prepared as described above. Portions of the eluate were collected, the solvent removed, the residues weighed and assayed and fractions assembled from consecutive residues on the basis of their physical and biological properties.

The first 500 ml. of eluate contained comparatively inactive oily material. The next 250 ml. contained two crystalline substances, one identical with fraction B (Example IV) described above; and the second different but of comparable biological activity designated fraction C. It was active on the antitumor assay at 10 mg./kg. This mixture of B and C weighed about 0.5–1.0 g., and was separated into its components by leaching C from B with ethyl acetate. Crystalline fraction C. M.P. 196–198° C. $(\alpha)_D^{25} = +5.06°$ (c. 0.4 in dimethyl formamide), in contrast to fraction B did not fluoresce when exposed to ultraviolet light and exhibited absorbtion maxima in the ultraviolet region of the spectrum at 262 m$\mu$ and 347 m$\mu$ $$E_{1\,cm.}^{1\%} = 428$$

and 138 respectively. The next 250 ml. of eluate contained rather low concentrations of dissolved solids which appeared to be B and C mixed with other materials. The next main fraction which weighed 1.5–2.5 g. was obtained from the 1 l. portion of eluate collected subsequent to the first 1.5 l. of eluate obtained. It proved to consist of two different crystalline forms of cycloheximide. These were designated the soft, fraction D, and hard fraction $D_2$ varieties. The hard variety had a sharp melting point at 118–119° C. in agreement with the value obtained for an authentic specimen which had been recrystallized twice from ether. There was no depression in the mixed melting point of the hard variety with the authentic specimen. The soft variety fraction D had a somewhat less distinct melting point at about 110° C. A mixture of the two forms melted below 100° C. Each crystalline form caused the crystallization of its own type from saturated solutions of cycloheximide. Differences in the infrared spectra of the soft and hard varieties employing 1% potassium bromide dilutions of the two substances were observed at the following wave numbers in the infrared region of the spectrum: 3584, 1364, 1321, 1199, 1186, 1101, 1087, 1081, 1073, and 980 cm.$^{-1}$.

The development of the silica gel chromatogram with additional isopropyl ether-aqueous methanol solvent mixture was continued until no further yeast-active material was obtained. Two liters of solvent were required. Evaporation of the solvent left a residue which proved to be highly active on the anti-tumor assay and consisted of pure compound E 73. This material, although in apparently pure condition, was not crystalline but it could be pulverized to a white powder. A crystalline sample was obtained from this material by treatment of a saturated solution of it in ethanol with four volumes of ether. This procedure resulted in the recovery of 75% of the non-crystalline solid as pure crystalline E 73, M.P. 140–141° C.

*Analysis.*—Calcd for C, H, O, N: C, 60.16; H, 7.42; N, 4.13. Found: C, 60.15; H, 7.61; N, 4.29. $(\alpha)_D^{25} = -8.8°$ (c. 1.0 in methanol).

Crystalline E 73 is moderately soluble in water, the lower alcohols and ether. It is readily soluble in chloroform, methylene chloride, and acetone. That the substance contains a carbonyl group is evidenced by the formation of derivatives with hydroxylamine and 2,4-dinitrophenylhydrazine. Quantitive determination of carbonyl oxygen by titration of the liberated HCl on reaction with hydroxylamine hydrochloride indicates 0.82 moles per mole of E 73 based on the above molecular weight. Characteristic absorption maxima in the infrared appear at the wave lengths tabulated herein.

*Example VI*

A crystalline acetate derivative was obtained by dissolving 0.3 g. of E 73 in 1 ml. of pyridine and 0.5 ml. of acetic anhydride and storing the mixture at room temperature for 24 hours. The liquids were evaporated in vacuo and the residue crystallized by treatment with ether. This product was then recrystallized from ether as rectangular plates, M.P. 170–171°.

*Analysis.*—Calcd. for: $C_{19}H_{27}O_7N$: C, 59.83; H, 7.14; N, 3.67. Found: C, 59.79; H, 7.29; N, 3.87 (% by weight).

A crystalline p-nitrobenzoate derivative was obtained in a similar fashion by treatment of 0.3 g. of E 73 dissolved in 1 ml. of pyridine with 0.2 g. of p-nitrobenzoyl chloride at 100° C. for 30 minutes. The mixture was cooled and treated with 100 ml. of 0.5 N-hydrochloric acid, and the precipitated solid collected and recrystallized from 1:4 methylene chloride ether providing the crystalline derivative as colorless plates, M.P. 167–168° C.

The acetate and p-nitro-benzoate derivatives prepared above are considered within the scope of the present invention as are other esters of the carboxylic acids. They are prepared similarly. Examples of such esters are the lower alkanoates such as the propionate, butyrate, valerate, succinate, acrylate, and maleate; the higher alkanoates such as the palmitate, and stearate; and the aromatic hydrocarbon carboxylates, such as the benzoate, toluate and naphthoate. For instance, the propionate and butyrate esters have been prepared by the procedure of Example VI, employing respectively 0.5 ml. of propionic anhydride. and 0.8 ml. of butyric anhydride in lieu of the 0.5 ml. of acetic anhydride. Inherent characteristics of these two esters and the above described p-nitrobenzoate are as follows:

*p-Nitrobenzoate.*—Calc. for $C_{24}H_{28}O_9N_2$: C, 59.02; H, 5.73; N, 5.73. Found: C, 58.57; H, 5.78; N, 5.86. M.P. 167–168°. Then rectangular plates from methylene chloride and ether.

*Propionate.*—Calc. for $C_{20}H_{29}O_7N$: C, 60.76; H, 7.39; N, 3.54. Found: 60.46; 7.60; N, 3.70. M.P. 196–97°. Colorless rectangular plates from methylene chloride and ether.

*Butyrate.*—Calc. for $C_{22}H_{31}O_7N$: C, 61.60; H, 7.62; N, 3.41. Found: 61.31, H, 7.60; N, 3.85. M.P. 181–82°. Colorless needles from methylene chloride and ether.

*Example VII*

Compound E 73, 1.0 g., prepared as described in Example V, was dissolved in 15 ml. of 6 N hydrochloric acid and the resulting clear solution allowed to stand at room temperature for 30 to 40 minutes. It was then diluted with 25 ml. of water and extracted with three 50 ml. portions of methylene chloride. Evaporation of the methylene chloride extract in vacuo yielded a colorless crystalline solid which was recrystallized from methylene chloride to yield pure desacetyl E 73; M.P. 165–166° C.; yield 0.25 g. This substance exhibits characteristic absorption maxima at the following wave lengths in reciprocal centimeters in the infrared region of the spectrum: 798, 820, 876, 879, 905, 927, 943, 957, 978, 991, 1019, 1035, 1050, 1062, 1069, 1079, 1103, 1139, 1153, 1196, 1232, 1255, 1266, 1292, 1307, 1326, 1335, 1372, 1387 1410, 1460, 1678, 1712, 1739, 2899, 2941, 3268, 3413 cm.$^{-1}$. It showed a weak maximum at about 285 m$\mu$ $(E_{cm.}^{1\%}=0.66)$ and intense end absorption in the ultraviolet region of the spectrum.

*Analysis.*—Calcd. for $C_{15}H_{23}O_5N$: C, 60.59; H, 7.80; N, 4.71. Found: C, 59.89; H, 7.48; N, 4.19.

Compound E 73 (1 g.), was again dissolved in 6 N hydrochloric acid and heated at 80° C. for five minutes. A crystalline product separated from the reaction mixture. The mixture was cooled and the precipitate collected by filtration. In one run 0.5 g. of the crude product was obtained. It was recrystallized from aqueous methanol by dissolving in hot methanol and adding warm water thereto until incipient turbidity developed. The colorless recrystallized product melted at 147–148° C. This material exhibits a strong maximum at 280 m$\mu$ ($E=2000$) in the ultraviolet region of the spectrum and had characteristic infrared spectrum bands at 2.90, 3.18, 5.80 and 5.92$\mu$ among others.

*Analysis.*—Calcd. for $C_{15}H_{19}O_3N$: C, 68.94; H, 7.33; N, 5.37. Found: C, 68.43; H, 7.52; N, 5.67.

This process was repeated substituting 1 g. of desacetyl E 73 for E 73 with the isolation of the aromatic compound identical with the above in approximately the same yield.

One-half gram of this aromatic dehydration product of both E 73 and desacetyl E 73 was dissolved in 5 ml. of acetic anhydride and 1 ml. of pyridine. The mixture was warmed on the steam bath with stirring for two hours. The reagents were then evaporated in vacuo and the residue crystallized from ether-methylene chloride mixture.

The monoacetyl derivative was obtained, M.P. 130–132° C.

Analysis.—Calcd. for $C_{17}H_{21}O_4N$: C, 66.32; H, 6.98; N, 4.62. Found: C, 66.47; H, 6.99; N, 4.66.

The aromatic dehydration product can also be prepared from cycloheximide by bromination with N-bromosuccinimide followed by dehydration and dehydrobromination with pyridine. It can also be obtained by reduction of the substance hereinbefore designated as fraction C with zinc amalgam in aqueous hydrochloric acid.

*Example VIII*

A number of the diesters of desacetyl E 73 were prepared by treatment of the E 73 hydrolysate with at least about two molar proportions of the corresponding carboxylic type acylating agent, e.g., hydrocarbon mono and dicarboxylic acid anhydrides, mixed anhydrides, or acid halides of acids having up to about 18 carbon atoms, such as acetic anhydride, propionic anhydride, benzoyl chloride, palmityl bromide, ethyl oleyl carbonate, phthalic anhydride, maleic anhydride and succinic anhydride, at temperatures of approximately 60–100° C. and preferably about 70–85° C., for a period of time from about 1 to 16 hours, in the presence of approximately 5 to 10 ml., per gram of sample, of a liquid tertiary amine solvent such as pyridine, triethylamine, ethyldimethylamine, benzyldimethylamine, etc., wherein each of the substituents of the tertiary amine is an aliphatic or araliphatic hydrocarbon group having up to about eight carbon atoms. The ester groups of the diesters of the present invention are thus of the formula RCOO— wherein R is the hydrocarbon or hydrocarboncarboxy group having from two to about seventeen carbon atoms of the esterified monocarboxylic acid or the partially esterified dicarboxylic acid.

For instance, desacetyl E 73, 0.1 g., was dissolved in 2 ml. of acetic anhydride and 0.5 ml. of pyridine and warmed on the steam bath for approximately 2 hrs. at 70–80° C. The mixture was kept overnight at room temperature and the reagent and solvent evaporated in a stream of air. The residue was crystallized from 1–10 ether-ethanol yielding a diacetate, melting point 178–180° C., showing no depression on admixture with a sample of the acetate of compound E 73 prepared as described in Example VI. This procedure repeated substituting propionic anhydride for acetic anhydride yields the dipropionate ester.

The dibenzoate of desacetyl E 73 was prepared by dissolving approximately 0.1 g. of desacetyl E 73 in 1 ml. of triethylamine and heating it with 0.2 g. of benzoyl chloride on a steam bath overnight at about 60–70° C. The product was recovered by evaporation of the solvent and crystallization of the residue from a mixture of ethanol and ether.

The dihemisuccinate ester of desacetyl E 73 was prepared by dissolving 0.1 g. of desacetyl E 73 and an equal weight of succinic anhydride in 2 ml. of pyridine. The solution was kept overnight at room temperature, the solvent evaporated, and the residue recrystallized from ethanol and ether providing the desired ester.

The dipalmitate of desacetyl E 73 was prepared by dissolving 0.1 g. of desaectyl E 73 and three times its weight of palmityl bromide in 2 ml. of dimethylethylamine. The reaction mixture was heated on the steam bath overnight, the solvent evaporated, and the residue recrystallized from ethanol and ether as above.

What is claimed is:

1. A compound selected from the group consisting of 3-[2-(5-acetoxy - 3,5 - dimethyl - 2 - oxocyclohexyl)-2-hydroxyethyl]glutarimide, the monoesters and the diesters thereof, the ester group being selected from the group consisting of alkanoates, aromatic hydrocarbon carboxylates and p-nitro-substituted aromatic hydrocarbon carboxylates, having from 2 to 17 carbon atoms.

2. 3-[2-(5-acetoxy - 3,5 - dimethyl-2-oxocyclohexyl)-2-hydroxyethyl]glutarimide.

3. The propionate ester of the compound of claim 2.
4. The p-nitrobenzoate ester of the compound of claim 2.
5. The butyrate ester of the compound of claim 2.
6. The process for preparing 3-[2-(5-hydroxy-3,5-dimethyl - 2 - oxocyclohexyl)-2-hydroxyethyl]glutarimide which comprises treating 3-[2-(5-acetoxy-3,5-dimethyl-2-oxocyclohexyl)-2-hydroxyethyl]glutarimide with a dilute aqueous solution of a mineral acid, having a concentration of about 5 to 30% by weight, at a temperature in the range of from about 5 to 40° C. for from about ½ to 48 hours.
7. 3-[2-(5-acetoxy - 3,5 - dimethyl - 2 - oxocyclohexyl)-2-acetoxyethyl]glutarimide.
8. Crystalline 3-[2-(5-hydroxy - 3,5 - dimethyl-2-oxocyclohexyl)-2-hydroxyethyl]glutarimide.

References Cited by the Examiner

UNITED STATES PATENTS

| | | | |
|---|---|---|---|
| 2,541,726 | 2/51 | Trussell | 195—80 |
| 2,545,572 | 3/51 | Dulaney | 195—80 |
| 2,601,205 | 6/52 | Campbell | 167—65 |
| 2,612,502 | 9/52 | Leach et al. | 167—65.03 |
| 2,848,455 | 8/58 | Hoffman | 260—281 |

OTHER REFERENCES

J. of Antibiotics, Ser. A, December 1954, pp. 175–176.

Pridham: Applied Microbiology, pp. 52–79, January 1958.

Reilly et al.: Antibiotics Annual, 1954–55, pub. 1955 by Med. Encyc., New York City, pp. 1002–1007.

Reilly et al.: Cancer Research, vol. 13, pp. 684–687, 1953.

Sensenbrenner: Cancer Chemotherapy Reports, vol. 5, pp. 65–6 (1959).

IRVING MARCUS, *Primary Examiner.*

MORRIS O. WOLK, WILLIAM B. KNIGHT, H. J. LIDOFF, NICHOLAS S. RIZZO, *Examiners.*

UNITED STATES PATENT OFFICE
CERTIFICATE OF CORRECTION

Patent No. 3,214,431            October 26, 1965

Koppaka V. Rao et al.

It is hereby certified that error appears in the above numbered patent requiring correction and that the said Letters Patent should read as corrected below.

Column 9, line 15, for "and" read -- end --; column 10, line 55, for "E 37" read -- E 73 --; column 14, line 43, for "C,H,O,N:" read -- $C_{17}H_{25}O_6N$: --.

Signed and sealed this 19th day of July 1966.

(SEAL)
Attest:

ERNEST W. SWIDER
Attesting Officer

EDWARD J. BRENNER
Commissioner of Patents